United States Patent [19]

Gallatin

[11] Patent Number: 4,598,926
[45] Date of Patent: Jul. 8, 1986

[54] ASYMMETRICAL FOUR-BAR LINK TRAILER HITCH

[76] Inventor: Norman W. Gallatin, Box 120, Garrison, Iowa 52229

[21] Appl. No.: 428,537

[22] Filed: Sep. 30, 1982

[51] Int. Cl.$^4$ .............................................. B62D 53/00
[52] U.S. Cl. .................................. 280/459; 280/461 R
[58] Field of Search ........... 280/461 R, 461 A, 456 R, 280/456 A, 446 R, 446 A, 446 B, 474, 459

[56] References Cited

U.S. PATENT DOCUMENTS

| | | | |
|---|---|---|---|
| 3,468,557 | 9/1969 | Ferrier | 280/446 B |
| 3,663,039 | 5/1972 | Morgan | 280/446 B |
| 3,790,191 | 2/1974 | Gallatin | 280/456 R |
| 4,106,794 | 8/1978 | Sallis | 280/456 R |

FOREIGN PATENT DOCUMENTS

| | | | |
|---|---|---|---|
| 143547 | 2/1931 | Switzerland | 280/461 R |
| 556290 | 9/1943 | United Kingdom | 280/459 |
| 1167773 | 10/1969 | United Kingdom | 280/446 B |

Primary Examiner—David M. Mitchell
Assistant Examiner—Mitchell J. Hill
Attorney, Agent, or Firm—Beveridge, DeGrandi and Weilacher

[57] ABSTRACT

A four-bar link trailer hitch comprising main and steering members, spaced apart and pivotally connected at their rearward ends to the trailer, and pivotally connected at their forward ends to the rearward end of a truck or the like. The main arm lies substantially upon the center line, as viewed in plan, and the steering arm is placed to one side, closer to the centerline at the forward end than the rear. Most of the towing load and any tongue weight is taken by the main arm. The steering arm serves to locate the trailer laterally.

7 Claims, 7 Drawing Figures

ASYMMETRICAL FOUR-BAR LINK TRAILER HITCH

FIELD OF THE INVENTION

This invention relates to trailer hitches and, more particularly, to four-bar link trailer hitches.

DISCUSSION OF THE PRIOR ART

Prior art is listed as follows: U.S. Pat. Nos. 2,444,944, Minter; Gallatin, 3,790,191; Miller, 3,787,068; Hinkley, 4,019,754; and Sallis, 4,106,794. Technical papers are listed as follows: D. Tesar, SAE Journal #800153; R. S. Sharp, "Steering Responses of Doubles"; and Tom Berg, "Twin Bar for Trailers", Heavy Duty Trucking Magazine, July, 1982.

The term "four-bar link" is perhaps more usual now in engineering practice than some of the terms used in prior art, such as "trapezoid hitch", "articulated hitch", "twin bar for trailers", "multiple-bar linkage", and so on. With the possible exception of "multiple-bar linkage", these terms are broadly interchangeable. All prior art references above describe symmetrical linkages which place the instantaneous center of rotation (ICR) forward of the actual hook-up points. The term ICR has been called in prior art: "Effective hitch pivot point", "apparent pivot point", and "virtual hitch point". All of the four-bar link hitches, along with the hitch described herein, share with semi-trailer, fifth wheel, and gooseneck towing systems, improved towing characteristics. The basic principles and advantages of four-bar link hitches as a class will not be described here.

There are some disadvantages to the prior art, symmetrical four-bar link hitches. In much of the prior art, there is longitudinal roll coupling. This roll coupling is not inherently bad; large semi-tractor trailer combinations seem to need it. But medium weight combinations such as pickup trucks and large gooseneck horse trailers do very well without. In lighter weight combinations any advantages of roll coupling may well be outweighed by torsional stresses on the tow vehicle and trailer.

Also, roll-coupled, four-bar link hitches are difficult to hook up to the tow vehicle. After one arm is hooked up, the roll-coupled hitch allows movement of the second arm in two dimensions only. Without roll-coupling, the second arm is free to move in three dimensions, facilitating hook up, especially on uneven ground. While Tesar shows in his FIGS. 3 and 4, one arm which is adjustable for both height and length for convenience of hook up, this adds complexity and expense to the design.

Gallatin suggests that one of the arms can be connected to the trailer to allow both lateral and vertical movement. This decouples longitudinal roll and facilitates hook up, but causes static as well as dynamic forces such as tongue weight and the downforce of braking to be off the centerline of both the towing vehicle and trailer.

More important in actual practice than roll-coupling is the fact that all vehicles now in use are now equipped, or are most easily equipped with a single, centrally-located hitch. Symmetrical four-bar hitch designs represent a radical change which is not easily adaptable to established trends of towing vehicle engineering. In such designs, two symmetrically-placed couplers on the tow vehicle lie outside the vast body of testing, engineering, production, tooling, etc., of industry. While the asymmetrical four-bar link hitch requires a second coupler, it can be relatively light duty and should therefore be less expensive.

All previous multiple-bar link hitch designs cause substantial limitations in the maximum turning angle between towing vehicle and trailer.

Existing multiple-bar link hitch designs require extremely accurate placement of the symmetrical couplers at the towing vehicle. A very small error in coupler placement will cause a correspondingly large displacement of the trailer centerline, relative to the centerline of the towing vehicle.

SUMMARY OF THE INVENTION

The invention described here carries the main push and pull loads of normal towing on a centralized main arm. Any towing weight is carried by the main arm. The main arm is fitted with a suitable coupler at the front for hooking up to the center of the rear of the tow vehicle. The rear, or trailer end, of the main arm is pivotally connected to the front of the trailer. In trailers requiring the tongue be supporting, a vertical hinge joint is used to connect the trailer to the main arm. The rear end of a second, less highly stressed steering arm is pivotally connected to the trailer to one side of the main arm. The front end of the steering arm is connected to the tow vehicle closer to the centerline than the rear. The steering arm bears a considerable resemblance to one arm of a symmetrical four-bar link hitch, but carries only light loads. The steering arm only serves to locate the front of the trailer laterally. A relatively light duty coupler must be added to one side of the central coupler on the tow vehicle.

The system described here separates the functions of the two arms and produces some unexpected advantages: hook up is very easy and very sharp turning angles are possible. The expected and attained objects are: connection to centralized hitch at the tow vehicle and longitudinal roll decoupling.

BRIEF DESCRIPTION OF THE DRAWINGS

FIG. 3 is most nearly equivalent to the plan views of FIGS. 1 and 2. A hinge joint is shown connecting the front end of the trailer to the rear end of the main arm. The steering arm is shown at a different height above the ground than the main arm.

FIG. 5 is included here for reference only.

DESCRIPTION OF THE PREFERRED EMBODIMENT

This description will be done in two parts. The first part will be a description of the physical structure, to be followed by a description of the operation and function.

Physical Structure

Figure 1:
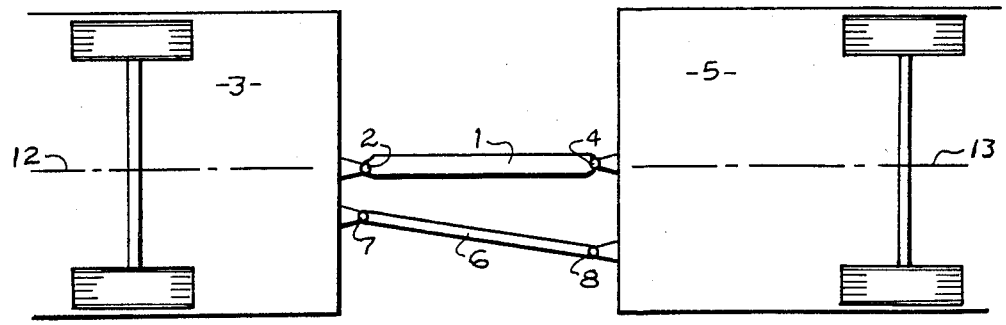
FIG. 1 is a plan view showing a fragmentary view of a towing vehicle, an asymmetrical four-bar link hitch and a trailer.

Referring to FIG. 1, it can be seen that the main arm (1) is substantially upon the center line of the towing vehicle (3) and trailer (5). Ball connection means (2) at the forward end of the main arm (1) is securely attached to the more or less center line (12, 13) of the rear of towing vehicle (3). At the rear end of main arm (1) vertical hinge joint means (4) are securely attached to the front of the trailer (5). A steering arm (6) is shown to one side of main arm (1). The forward end of steering arm (6) is securely attached by ball connection means (7) to the rear end of towing vehicle (3) at a point a distance to one side of the center line of the towing vehicle (3), center line (12, 13), at the rear of steering arm (6), ball connection means (8) securely attached to the trailer (5) at a greater distance from the center line than the distance of ball connection means (7).

Figure 2:
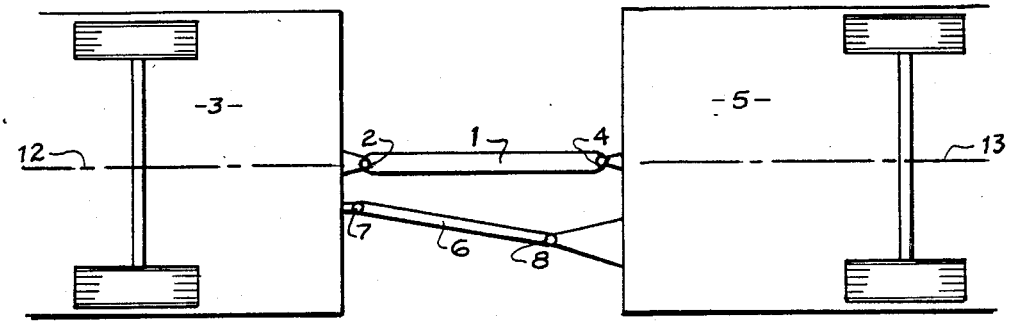
FIG. 2 is similar to FIG. 1 except that the connecting points of the off-center arm, or more properly, the steering arm, are moved to a position forward of the corresponding connection points of the main arm.

Referring now to FIG. 2, it will be seen that the main arm (1) with the pivotal connections (2) and (4) is a similar structure to the equivalent main arm of FIG. 1. Steering arm (6) is similar to the equivalent structure shown in FIG. 1 except that pivotal connections (7) and (8) have been located more forwardly relative to the positions of the pivotal connections (2) and (4) of main arm (1).

Figure 3:
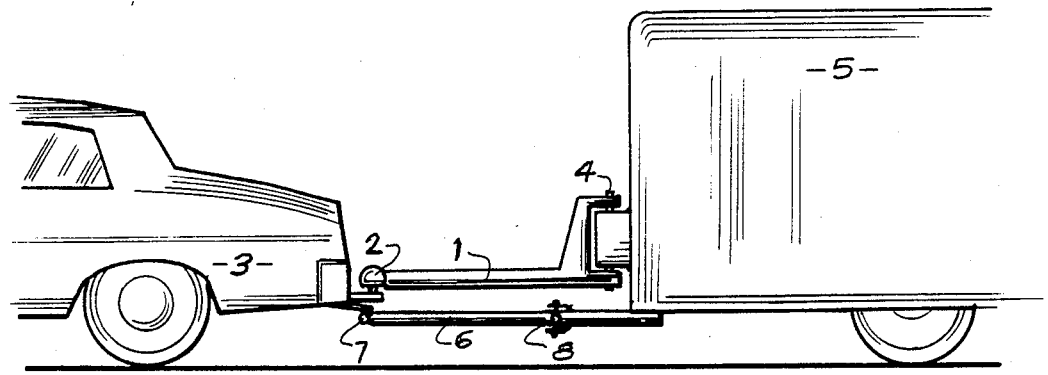
FIG. 3 shows an elevation view of a tow vehicle, connecting arms and a trailer. In general.

Referring now to FIG. 3, a main arm (1) is connected at the front by ball coupler means (2) or the like to appropriate structure securely attached to the rear end of a tow vehicle (3). The rearward end of main arm (1) is shown here with vertical hinge connection means (4) suitably attached to the trailer (5) structure. Steering arm (6) is attached at the forward end by ball coupler means (7) or the like. For clarity, main arm (1) and steering arm (6) are shown an exaggerated distance apart, but it should be noted that ball coupler means (7) and the body of the steering arm (6) are located at an elevation below the rear body structure of the tow vehicle (3) and below the ball coupler means (2) and the body of the main arm (1). The rear of steering arm (6) is attached to the trailer by suitable structure with ball connection means (8).

Figure 4:
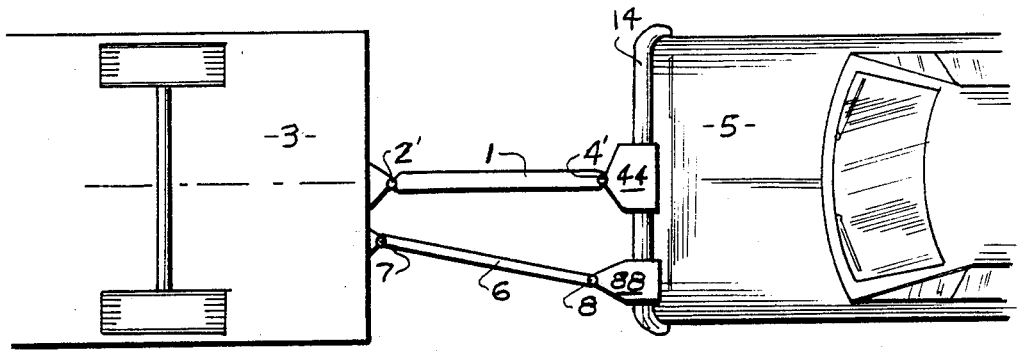
FIG. 4 is a plan view of a towing vehicle, and a towed vehicle connected by an asymmetrical four-bar link tow bar assembly.

Referring now to FIG. 4, a main arm (1) connects a towing vehicle (3) to a towed vehicle (5) by ball connection means (2) and (4'). Ball connections means (4') is attached by support structure (44) to the front bumper (14) or other suitable structure of the towed vehicle (5). A steering arm (6) is attached at the front by ball coupler means (7) or the like to the rear end of towing vehicle (3). The rear of steering arm (6) is attached by support structure (88) to the front bumper (14) or other suitable structure of the towed vehicle by ball connection means (8).

Figure 5:
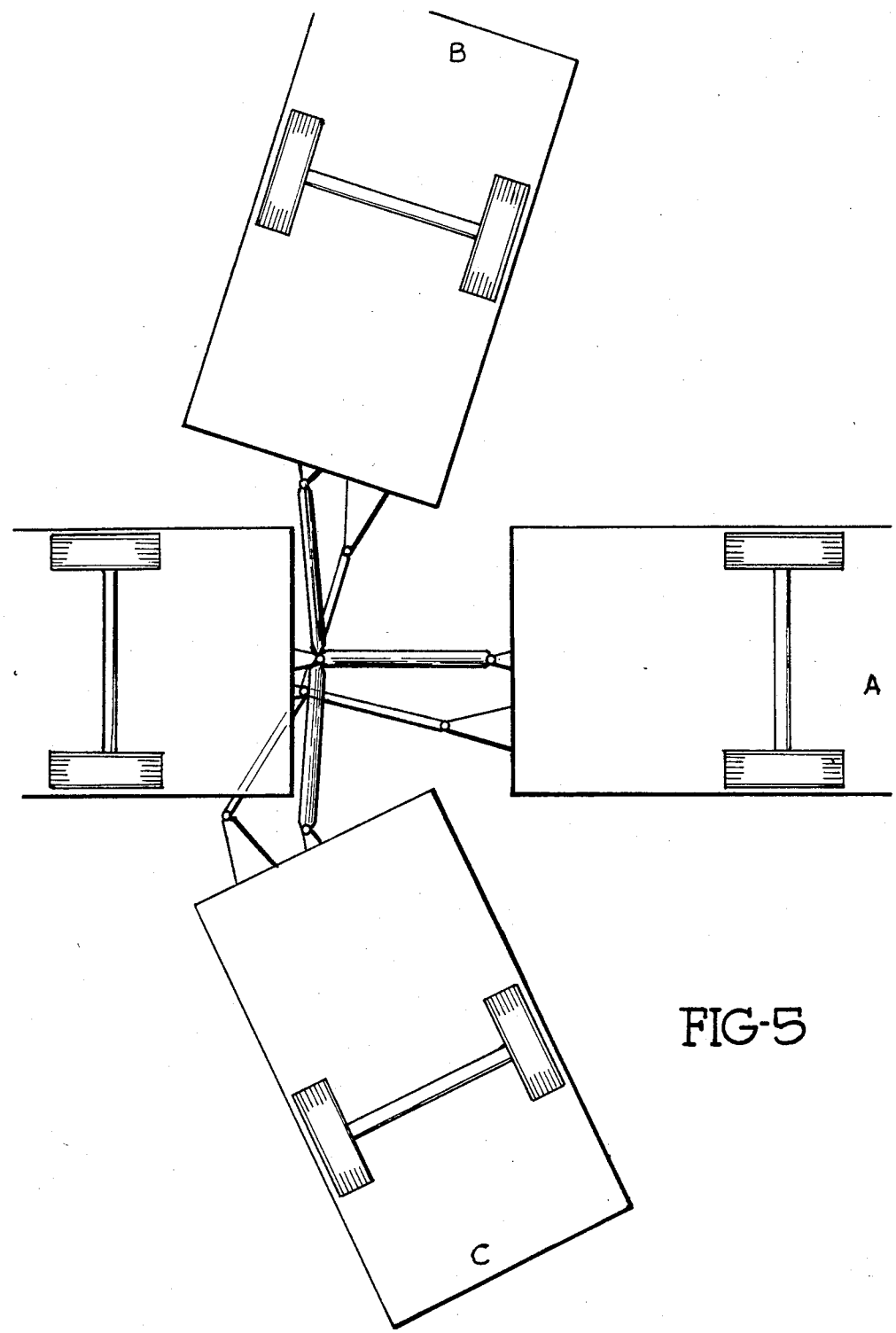
FIG. 5 is a plan view showing a fragmentary view of a tow vehicle, views of the hitch and trailer in the straight ahead and near extreme right and left positions. The different trailer positions are denoted by the letters A, B and C.

FIG. 5 will have no reference in this section to special hitch parts.

Referring now to FIG. 6, again a main arm (1) is shown substantially on the centerline (12, 13) and connected at the forward end of the main arm (1) to the rear end of the towing vehicle (3) by draft hook and eye, ball means or the like (2). At the rear end of main arm (1) hinge connection means (4) attach to the frame (5) of a converter dolly (11) or the like. As in FIG. 1, a steering arm (6) is shown to one side of main arm (1). The forward end of the steering arm (6) is securely attached by ball connection means (7) or the like to the rear end of the towing vehicle (3) at a point a distance from the centerline (12, 13). The rear end of steering arm (6) is attached by ball connection means (8) securely to the frame (5) of the converter dolly (11), and at a greater distance from the center line than ball connection means (7).

Figure 7:
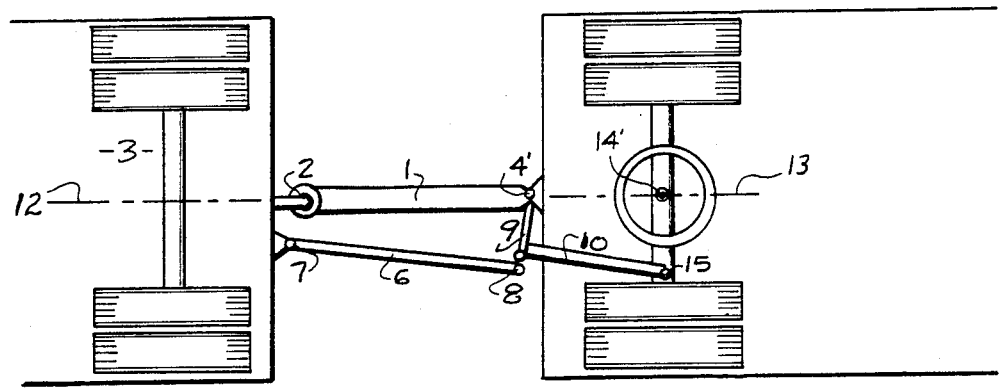
FIG. 7 is a fragmentary view of a towing vehicle, an asymmetrical four-bar link hitch, with added link to center pivot steering axle.

Referring now to FIG. 7, a main arm (1) is connected at the forward end by draft hook and eye means (2) or the like to the center of the rear of towing vehicle (3). Main arm (1) is connected to the trailer (5) by ball connection (4') or like means to suitable structure at the forward end of trailer (5). A steering arm (6) is connected at the forward end by ball connection means (7) to suitable structure at the rear and to one side of the center of the towing vehicle (3). The rear end of steering arm (6) is connected by ball means (8) to idler arm (9). Idler arm (9) is hinge connected about a vertical axis near or intersecting point (4'). In this embodiment, steering arm (6), idler arm (9) should be some vertical distance below the front of the body of the trailer (5), as steering arm (6) and idler arm (9) need clearance. Steering link (10) is ball connected to idler arm (9) at or substantially at ball means (8) and said steering link (10) is ball connected to a point (15) on the center pivot steering axle (11). The distance between the pivot (14') of the steering axle and point (15) on the steering axle (11) is greater than the distance between ball connection means (7) and draft hook and eye means (2').

Operation and Function

FIG. 1 is the simplest, general-case embodiment of this invention. The main arm (1) supports the front end of trailer (5) because the vertical hinge joint means (4) only allows lateral movement. Main arm (1) takes all of the push and pull loads inherent in straight-ahead towing, and also carries the tongue weight and the downforce loads created by applying the trailer brakes. Main arm (1) shall be constructed to carry loads and withstand stresses similar to conventional single-pivot hitches.

Connecting this trailer is also inherently easier than either conventional trailers or prior art, fourbar hitch trailers, which have no special provision on one of the arms for height and/or length adjustments. The lateral freedom of movement of main arm (1) facilitates ease of hook up to the center coupler (not shown separately from (2)). That same lateral freedom of movement exists after the main arm (1) is connected, and the jack or other support removed. The front of the trailer (5) can be moved laterally until a position is found where steering arm (6) can be connected.

Since steering arm (6) serves only to locate the trailer (5) laterally, the loading and therefore the strength required of the steering arm (6) is moderate. Lateral location of the trailer (5) can also economically include a "fine adjustment" capability of steering arm (6) for adjustment of this low-stress member. The ball connection means (8) can be a commercial tie rod end with a threaded shank. This facilitates length adjustments of said steering arm (6).

The asymmetrical nature of this invention and the different geometries of right and left turns do not present any of the problems that might intuitively be expected. At the speed necessary to cause resonate trailer yaw (trailer sway), the towing vehicle and trailer combination is never more than a few degrees away from the straight-ahead position. By physical testing, a trailer with the geometry of FIG. 1 pulls much better than a conventional trailer, and compares very favorably with conventional four-bar link trailer hitches.

Two vertically spaced apart arms with ball connections at the ends and spaced farther apart toward the trailer can transfer tongue weight forward and have other advantages (Sallis U.S. Pat. No. 4,106,794) (not shown here). At the point of connection with the tow vehicle, two arms so vertically spaced apart behave, when viewed in plan, as one arm. Except for these doubled main arms' special properties during pitch motions of the tow vehicle, two arms also behave exactly as a single arm with a vertical hinge joint at the connection to the trailer. Two arms so vertically spaced have demonstrated excellent performance in the position of the main arm. When placed at the center line, two arms offer every advantage of the single main arm while also conferring the special advantages in ride qualities associated with them. Two vertically spaced apart main arms as described here (but not shown) are also at least as easy to hook up as any four-bar link hitch.

Refocusing our attention again to FIG. 2, it has been found that considerable variation is possible in the longitudinal placement of ball connection means (7) and (8) of steering arm (6). The particular geometry of a given application can therefore be designed to allow the sharpest possible turning angle. The lateral displacement of steering arm (6) with respect to the main arm (1) at the trailer end can be adjusted to be forgiving of any trailer construction restraints as long as point (7) is moved laterally to maintain a suitable ICR.

Two modifications of the above-described pivot locations for steering arm (6) that improve the tracking geometry and allow the sharpest turning angles are shown in FIG. 2. By moving ball connection means (8) forward, relative to the ball connection means (4) location as illustrated in FIG. 1, the right and left hand turning geometries become much more similar than those geometries of FIG. 1, especially in the important first few degrees away from the straight-ahead position. Moving ball connection pivot means (7) a lesser amount forward will cause a further improvement in the comparative geometric behavior of right and left hand turns.

The elevation view FIG. 3 shows the steering arm (6) placed so that unobstructed passage underneath both the rear body structure of the towing vehicle (3) and unobstructed passage under main arm (1) and ball coupler means (2). If steering arm support structure (9) is placed at a low enough elevation, then both steering arm (6) and support structure (9) can pass underneath the body structure of the tow vehicle (3).

The modified geometry of FIG. 2 is considered the preferred geometry, and is incorporated in FIGS. 2, 3, 4, 5 and 6.

Referring now to FIG. 4, the operation of this two-bar system is similar to the previously described hitches except that if front bumper (14) attachment structures (44) and (88) are not fabricated in a manner that can maintain some fixed distance between ball connection means (4') and (8), then some form of adjustment of the length of one of the arms must be provided to center the towed vehicle (5). As previously mentioned, it is most feasible to provide that tracking adjustment at the rear end of steering arm (6). It is suggested that more emphasis be placed upon the behavior of the ICR and less emphasis be placed upon sharp turning angles in this embodiment. Also, a generally wider spacing of steering arm (6) relative to the centerline will minimize the effects of any lash in the hitch system.

A slight steering effect will occur when there is relative longitudinal roll between the tow vehicle (3) and trailer (5). At high speeds where this would be expected to matter, there is little likelihood of any large amount of relative roll between the two vehicles. In practice, this steering effect does not seem to be detectable.

Figure 6:
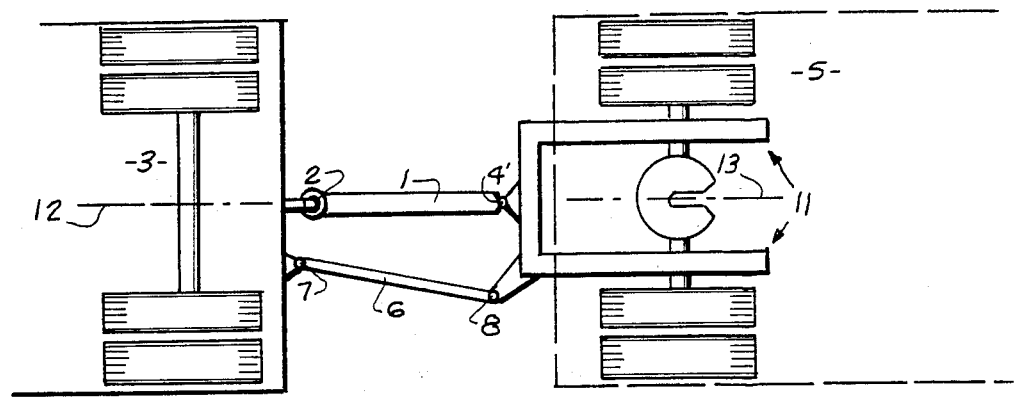
FIG. 6 is similar to FIG. 1 and is a fragmentary plan view of a towing vehicle, a four-bar link hitch, a converter dolly and a trailer. A center pivot steering axle of the converter dolly type is shown coupled to the rear end of the asymmetrical four-bar link hitch. The trailer attached to said center pivot is shown in light, dashed line.

In FIG. 6, a converter dolly is shown generally indicated by numeral (11). Since a converter dolly (11) or any other center pivot steering axle can be considered as a short, separate trailer and the main body of the trailer can be considered as a second, larger trailer being connected at the center pivot, then the basic functioning of the hitch is similar to the previously describe variations. While it would be possible to support the tongue in some other manner such as a third, torque reaction arm (not shown), the pivot hinge connection means (4) at the rear end of main arm (1) should be (and is) described as a vertical hinge joint. Other center pivot steering axles should have ball connection means at the rear of main arm (1).

If it is desired to connect the main arm (1) to the body or frame of the main part of trailer (5) having a center pivot steering axle (11), then the mechanism shown in FIG. 7 has good geometry for the first few degrees to each side of the centerline. It is intended that main arm (1) be restrained after a very few degrees of movement about draft hook and eye means (2'). Slightly slack chains (not shown) connecting the rear corners of the tow vehicle (3) and a point on the rear of main arm (1) near ball connection means (4'), allow center pivot steering axle (11) to follow an ICR well forward in the tow vehicle (3) for good towing characteristics. In sharp turns, which cannot in any case be made at highway speeds, the chain to the outside of the turn will become tight, causing main arm (1) and center pivot steering axle (11) to behave as a rigid extension (in plan view) of the towing vehicle (3). While these sharp turns will cause a severe amount of tire scrub, many truck parking lots are surfaced in gravel which helps to alleviate the problem. Of course, the trailer (5) will still pivot freely on pivot (14') in any case.

In sharp turns, when the steering axle is scrubbing, the loads on the steering arm (6), the idler arm (9), steering link (10) and associated joints, hinges and support structure, are very much greater than the loads that are encountered in normal driving.

This embodiment only has good geometric characteristics for a few degrees of turn. The preferred embodiment of this must have restraining chains.

The chain-restrained system described here is, of course, also suitable for converter dollies or for the steering axles of western tanker type trailers. This method solves both high speed stability problems and severely limits off-tracking. There is no form of this invention intended to have longitudinal roll coupling between the the tow vehicle and trailer. There is no form of this invention which is to have a hinge joint at the rear of the steering arm.

The hitch of FIG. 1 has been road tested, and found to tow well. The hitch shown in FIG. 2 has been extensively tested, towed well and allowed sharper turning angles than the hitch of FIG. 1. Very extensive testing has been done on a hitch which had two vertically spaced main members as described (but not shown) here, with a steering arm as in FIG. 2. The pivot points were chosen for maximum sharp turning ability, which is close to 90 degrees of each side.

In practical experience with the asymmetrical four-bar link hitch, it has been found that the expected variations in right and left turns were at road speeds, undetectable. The relative roll steering effect should be most noticeable when the steering arm is located at a different elevation, and was, in practice, undetectable. Since there is a large amount of variation possible in the location of the pivot points that will give excellent performance, the location of those points can be chosen to suit other factors also.

I claim:

1. A method of towing a trailer behind a vehicle, wherein
    said vehicle has a rearward end;
    said trailer has a forward end;
    an asymmetrical four-bar link hitch means connects said trailer means to said vehicle, said hitch means includes a main hitch member and a steering hitch member, each of said hitch members having rearward and forward ends;
    said hitch members have pivotal connection means at their rearward ends and at their forward ends;
    said main hitch member extends longitudinally in substantial alignment with the longitudinal axis of said vehicle and said trailer means;
    said steering hitch member is laterally spaced relative to said main hitch member with the forward ends of said hitch members being spaced apart a distance less than the rear ends thereof; and
    said method being performed by using the hitch means to pull the trailer behind the vehicle, and turning the vehicle left and right while said steering hitch member remains located on only one side of the main hitch member.

2. The invention according to claim 1 wherein the rearward end of said main hitch member is pivotally connected about a substantially vertical axis hinge joint means to the front of said trailer means.

3. The invention according to claim 1 wherein the rearward pivotal connection of said steering hitch member is located forward of a transverse vertical plane located upon the vertical centerline of the rearward pivotal connection of said main hitch member.

4. The invention according to claim 1 wherein the forward pivotal connection of said steering hitch member is located forward of a transverse vertical plane located upon the vertical centerline of the forward pivotal connection of said main hitch member.

5. A method of towing a trailer behind a vehicle, wherein:
    a. a vehicle has a rearward end;
    b. a trailer has a center pivot steering axle mounted at the forward end thereof, said center pivot steering axle including a pair of spaced apart wheel means having a connecting support extending therebetween;
    c. an asymmetrical four-bar link hitch means connects said support with said vehicle;
    d. said hitch means includes a main hitch member and a steering hitch member, said hitch members each having forward and rearward ends;
    e. the forward ends of said hitch members are pivotally connected to said vehicle;
    f. the rearward ends of said hitch members are pivotally connected to said support;
    g. said main hitch member extends longitudinally in substantial alignment with the longitudinal axis of said vehicle and said center pivot steering axle;
    h. said steering hitch member is laterally spaced on one side of said main hitch member, with the forward ends of said hitch members being spaced apart a distance less than the rear ends of the hitch members; and
    i. said method being performed by using the hitch means to pull the trailer behind the vehicle, and turning the vehicle left and right while said steering hitch member remains located on only one side of the main hitch member.

6. The invention according to claim 5 wherein:
    a. said center pivot steering axle means is detachably connected to said trailer means at said center pivot; and
    b. the rearward end of said main hitch member is pivotally connected about a substantially vertical axis hinge joint means to the front of said center pivot steering axle means.

7.
    a. a vehicle having a rearward end;
    b. a trailer means having a forward end;
    c. four bar link hitch means connecting said trailer means to said vehicle, including two hitch members having rearward and forward ends, one of said hitch members extending longitudinally in substantial alignment with the longitudinal axis of said vehicle and said trailer means;
    d. said hitch members pivotally connected at their forward ends for vertical and horizontal movement to the rearward end of said vehicle;
    e. one of said hitch members pivotally connected at its rearward end to the forward end of said trailer means for vertical and horizontal movement;
    f. one of said hitch members pivotally connected at its rearward end to the forward end of said trailer means about a substantially vertical axis hinge joint means; and
    g. one of said hitch members being located at a lower vertical elevation than the other hitch member to provide vertical elevation clearance between the members at the rear of said vehicle.

* * * * *